(12) United States Patent
Weindorf

(10) Patent No.: US 8,157,107 B2
(45) Date of Patent: Apr. 17, 2012

(54) FILTER WITH BAYONET COUPLING TO COVER

(75) Inventor: Martin Weindorf, Kornwestheim (DE)

(73) Assignee: Mann+Hummel GmbH, Ludwigsburg (DE)

(*) Notice: Subject to any disclaimer, the term of this patent is extended or adjusted under 35 U.S.C. 154(b) by 716 days.

(21) Appl. No.: 12/332,612

(22) Filed: Dec. 11, 2008

(65) Prior Publication Data

US 2009/0301950 A1 Dec. 10, 2009

(30) Foreign Application Priority Data

Dec. 14, 2007 (DE) .................. 20 2007 017 614 U

(51) Int. Cl.
B01D 27/00 (2006.01)
B01D 35/30 (2006.01)
(52) U.S. Cl. ........ 210/505; 210/440; 210/441; 210/450; 210/493.2; 210/130; 210/238; 210/454; 210/232; 210/442
(58) Field of Classification Search ................... 210/505, 210/441, 450, 456, 457, 493.2, 130, 238, 210/440, 454, 470, 232, 442
See application file for complete search history.

(56) References Cited

U.S. PATENT DOCUMENTS 4,941,975 A 7/1990 Hermann
6,251,273 B1* 6/2001 Jawurek et al. ............... 210/232
2002/0100720 A1 8/2002 Jainek
2006/0118476 A1* 6/2006 Weindorf et al. ............. 210/234
2007/0232475 A1* 10/2007 Baumann ........................ 494/36

FOREIGN PATENT DOCUMENTS

DE 3405929 A1 6/1984
DE 19827297 A1 12/1999
DE 102004038814 A1 3/2006
EP 1216740 A 6/2002
WO WO2005005014 A 1/2005

OTHER PUBLICATIONS

EPO search report for EP application is same patent family (parallel application): EP08167640.

* cited by examiner

Primary Examiner — Krishnan S Menon
Assistant Examiner — Allison M Gionta
(74) Attorney, Agent, or Firm — James Hasselbeck

(57) ABSTRACT

A liquid filter has a filter housing with a first thread and a drain passage. A filter element including a filter medium is arranged in the filter housing. A filter lid is provided with a second thread configured to engage the first thread for connecting the filter lid to the filter housing. The filter lid further has a filter by pass valve for bypassing the filter element when a pressure loss that is too high occurs when liquid passes through the filter medium of the filter element. First bayonet connectors are provided on the filter lid and second bayonet connectors are provided on the filter element for connecting the filter element to the filter lid by engaging the first bayonet connectors. A double-concentric seal is arranged on the filter element for closing off the drain passage.

3 Claims, 6 Drawing Sheets

FILTER WITH BAYONET COUPLING TO COVER

TECHNICAL FIELD

The invention relates to a filter, in particular an oil filter or fuel filter for a motor vehicle. The invention further relates to a round filter element comprised of a filter medium for use in the aforementioned filter, in particular oil filter or fuel filter for a motor vehicle.

BACKGROUND OF THE INVENTION

In known upright oil filters, the filter element is to be frequently removed together with the filter lid after unscrewing the filter lid. In this connection, the filter element is often attached by detent hooks on the filter lid. Such a filter element that is secured by detent hooks on the filter lid is disclosed, for example, in DE 299 21 168. In this disclosure, the detent hooks of the filter lid must however be decoupled in the mounted operating state from the filter element. If this were not the case, axial movement of the lid would be transmitted onto the filter element thus causing friction and wear at sealing locations of the filter element. This entails the risk of seal wear on the filter element and the danger of internal leakage from the unfiltered to the filtered side or return flow into the oil pan. In an extreme situation, the oil pressure could collapse. One way to overcome this is to provide an axial and/or radial play between filter element and filter lid. However, this can be disadvantageous in regard to a safe attachment force and securing force of the detent hook connection. The axial play must first be overcome by screwing on the lid. As a whole, this leads to increased adjustment expenditure in the manufacture of the filter in order to be able to provide a satisfactory securing force and to prevent that the filter element is affected by pulsation of the filter lid or the filter housing.

Therefore there remains a need in the art for an upright filter that allows removal of the filter element together with the filter lid from the filter housing, that provides in operation decoupling of the filter element from the filter lid, and that can be inexpensively and simply produced.

SUMMARY OF THE INVENTION

In accordance with the present invention, decoupling of the filter element from the filter lid in operation in a way that can be inexpensively and simply produced is provided herein. This is achieved in that the filter, especially an oil filter or fuel filter for a motor vehicle, includes a filter housing with a first thread and a drain passage. Onto this filter housing a filter lid is screwed by means of a second thread. On the filter lid a filter bypass valve is provided for bypassing the filter element when a pressure loss that is too high is experienced upon passing of the liquid through the filter medium of the filter element. The filter bypass valve can alternatively also be realized on the filter element or can be of a multi-part configuration distributed on the filter element and the filter lid. On the filter lid first bayonet connectors are provided. The filter element comprises a filter medium and can be embodied as a round filter element with star-folded bellows. Second bayonet connectors for attaching the filter element to the filter lid are arranged on the filter element. The first and second bayonet connectors are matched to one another in such a way that the filter element can be inserted into the lid such that the first bayonet connectors and the second bayonet connectors lockingly engage one another. The first and second bayonet connectors are designed such that, upon screwing the filter lid together with the filter element connected by the bayonet connectors to the filter lid into the filter housing, they will be released as the filter lid is screwed into the filter housing.

For releasing them, the bayonet connectors must be movable more easily than friction produced by a double-concentric seal that is provided on the filter element for closing the drain passage. When turning the filter lid, the first bayonet connectors of the filter lid slide out of the second bayonet connectors of the filter element and upon further rotation they impact on the second bayonet connectors without engaging them. The filter element is therefore decoupled from the filter lid after the filter lid has been screwed on.

The double-concentric seal on the filter element for the drain passage of the filter housing is designed such that in interaction with the walls of the drain passage the drain passage is opened first at the side of the outer one of the seal elements and then at the side of the inner one of the seal elements. This can be realized, for example, by side walls of different height at the exterior and interior sides of the drain passage or by seal elements of different height.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
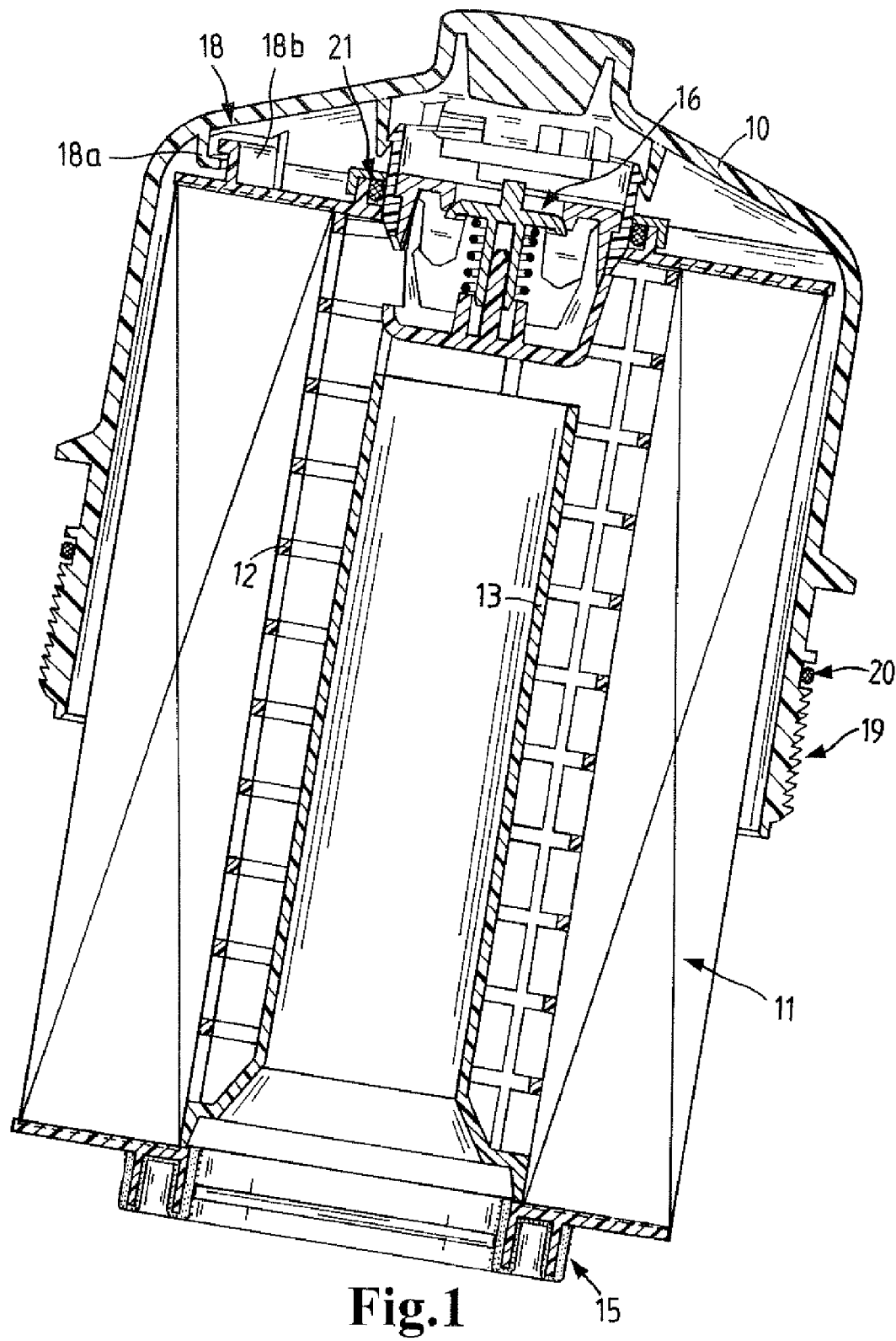
FIG. 1 shows a filter element locked in the filter lid, consistent with the present invention.

FIG. 1 illustrates a filter element 11 seated in the filter lid 10 and provided with an integrated support tube 12. However, such a support tube 12 can also be fixedly mounted in the housing. Within the support tube 12 there is a standpipe 13. The standpipe 13 prevents, when removing the filter element 11, mixing of oil of the unfiltered side with oil of the filtered side. The drain passage 14 (see FIG. 2) is separated by a double-concentric seal 15 from the filtered side as well as from the unfiltered side. The double-concentric seal 15 can be produced by a two-component method, for example, by injection molding a combination of hard and soft sealing materials. A filter bypass valve 16 is fixedly snapped into place as a permanent filter part in the filter lid 10 and opens for an opening pressure of approximately 2 bar. Alternatively, such a bypass valve 16 can also be arranged in the filter element 11.

The filter element 11 is illustrated in FIG. 1 in the position for removing the filter lid 10 from the filter housing 17 or inserting it into the filter housing 17 (see FIG. 2); the bayonet closure 18 is locked so that the filter element 11 is secured in the filter lid 10. The filter lid 10 has a sawtooth thread 19 and seals radially relative to the filter housing 17 into which it can be screwed. The seal 20 is in the form of an O-ring that is generally replaced when changing the filter element 11. The seal 21 relative to the filter bypass valve 16 is also realized in the form of an O-ring that is secured by a ring clamp.

Figure 2:
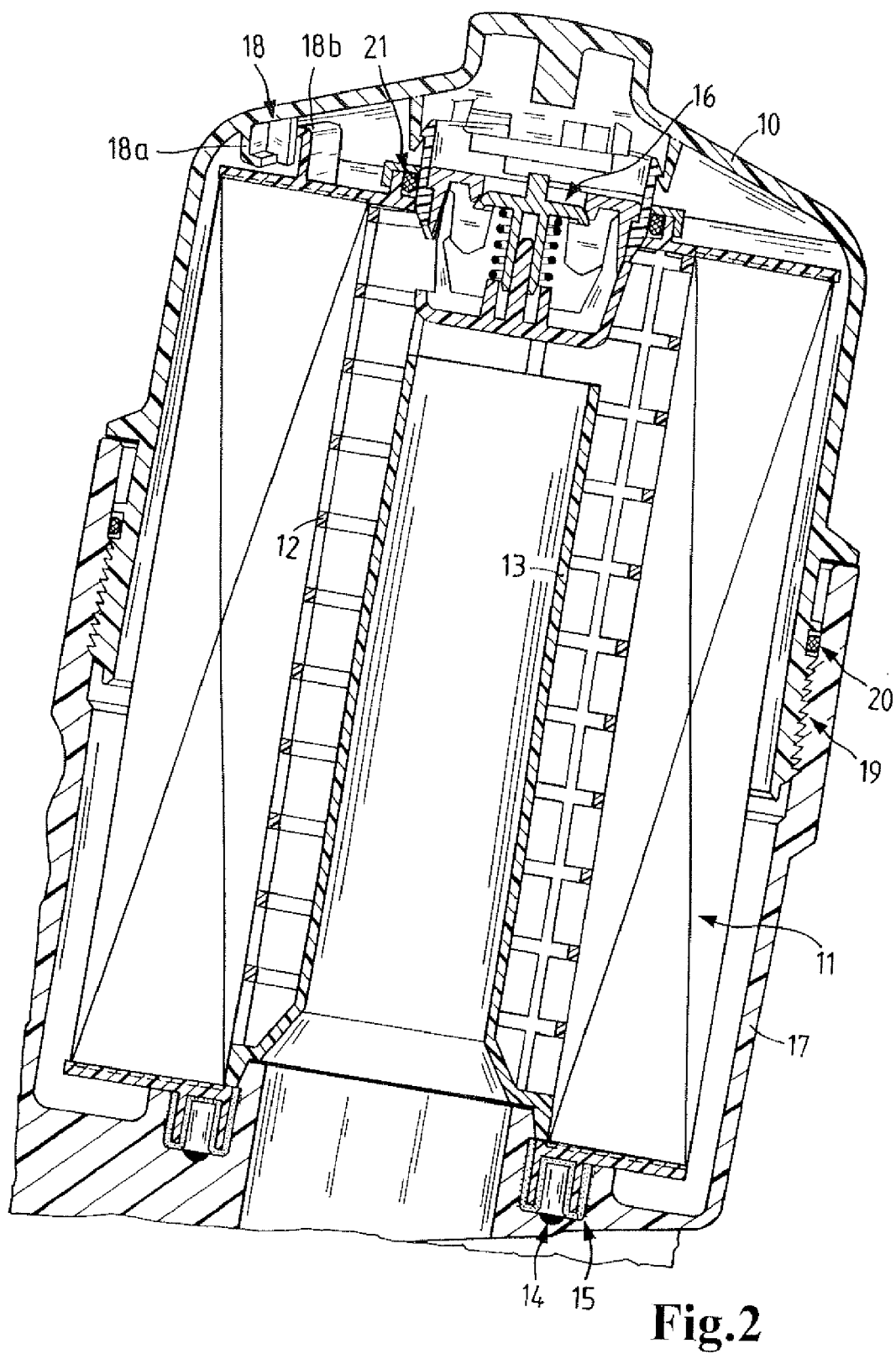
FIG. 2 shows the filter element mounted in the housing.

FIG. 2 shows the filter lid 10 screwed together with the filter element 11 into the filter housing 17. When screwing the filter lid 10 into the filter housing 17, the filter element 11 is frictionally braked with regard to the rotational movement by friction caused at the lower sealing location 15; the bayonet connectors in the form of bayonet hooks 18a are thus released. The bayonet hooks 18a of the filter lid 10 are L-shaped and upon further rotation impact with their vertical area at the bayonet locks 18b of the filter element 11. In operation the pulsing filter lid 10 is thus decoupled from the filter element 11 and a relative movement of filter element 11 with filter housing 17 is avoided. The thread pitch causes the filter lid 10 to move downwardly causing also the filter element 11 to move downwardly so that it seals the drain passage 14 at both concentric sealing locations of the seal 15.

Figure 3A:
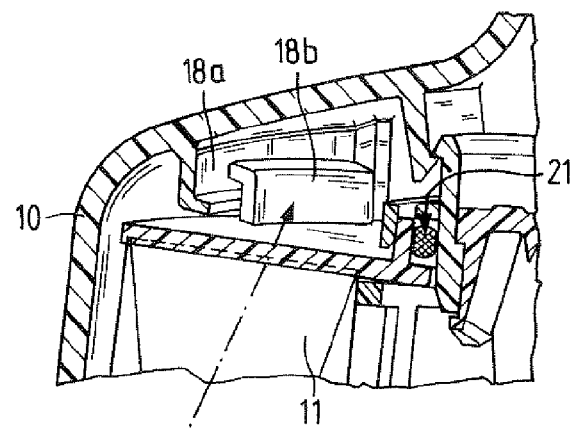
FIGS. 3a and 3b show the filter element with locked and released bayonet connectors, respectively.
Figure 3A:
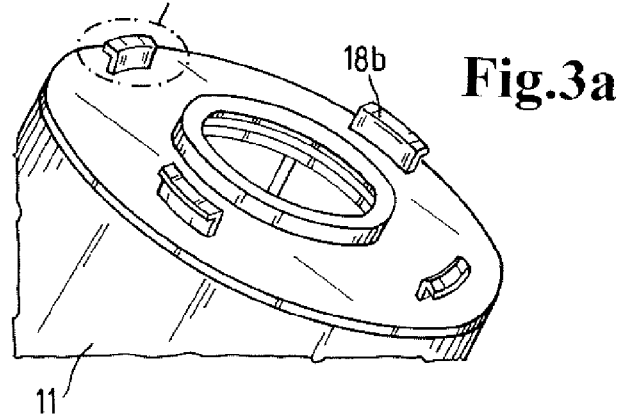
Figure 3B:
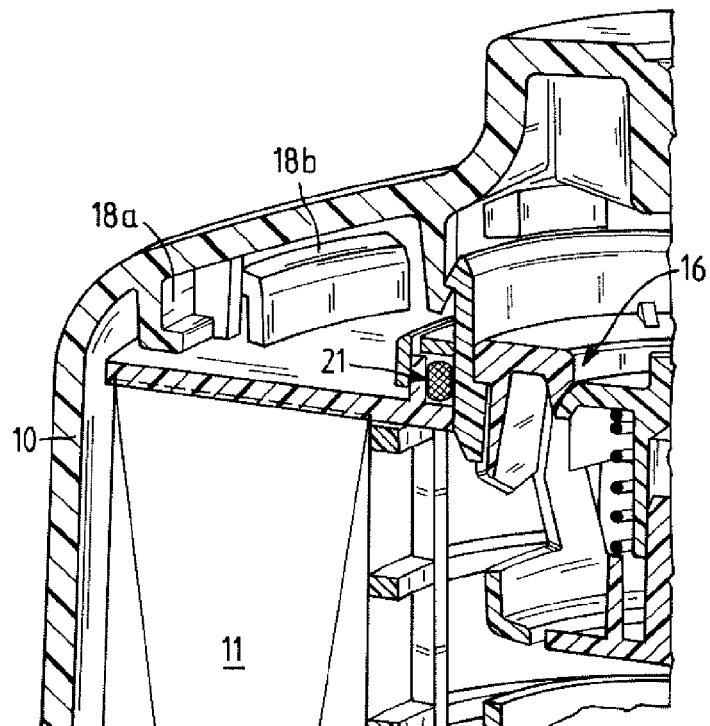

FIG. 3a and FIG. 3b show the bayonet closure 18 in the locked and released states. The bayonet closure 18 in the mounted state is always decoupled so that pulsations do not cause relative movement of the filter element 11 in the housing 17. Pulsations can be caused by the oil pump of the oil circulation to which the oil filter is connected.

Figure 4:
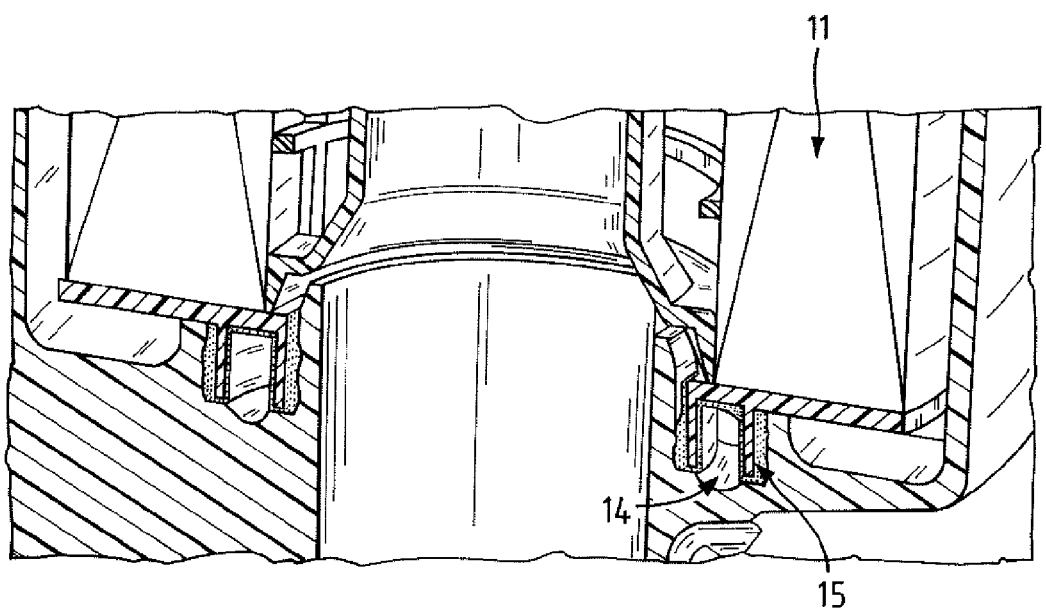
FIG. 4 shows the drain passage closed by the double-concentric seal of the filter element.

FIG. 4 shows that as a result of the oil pressure the filter element 11 is always forced downwardly into the sealing seat of the double-concentric seal 15. The circular drain passage 14 in operation is pressureless so that a differential pressure relative to the oil circulation results.

Figure 5:
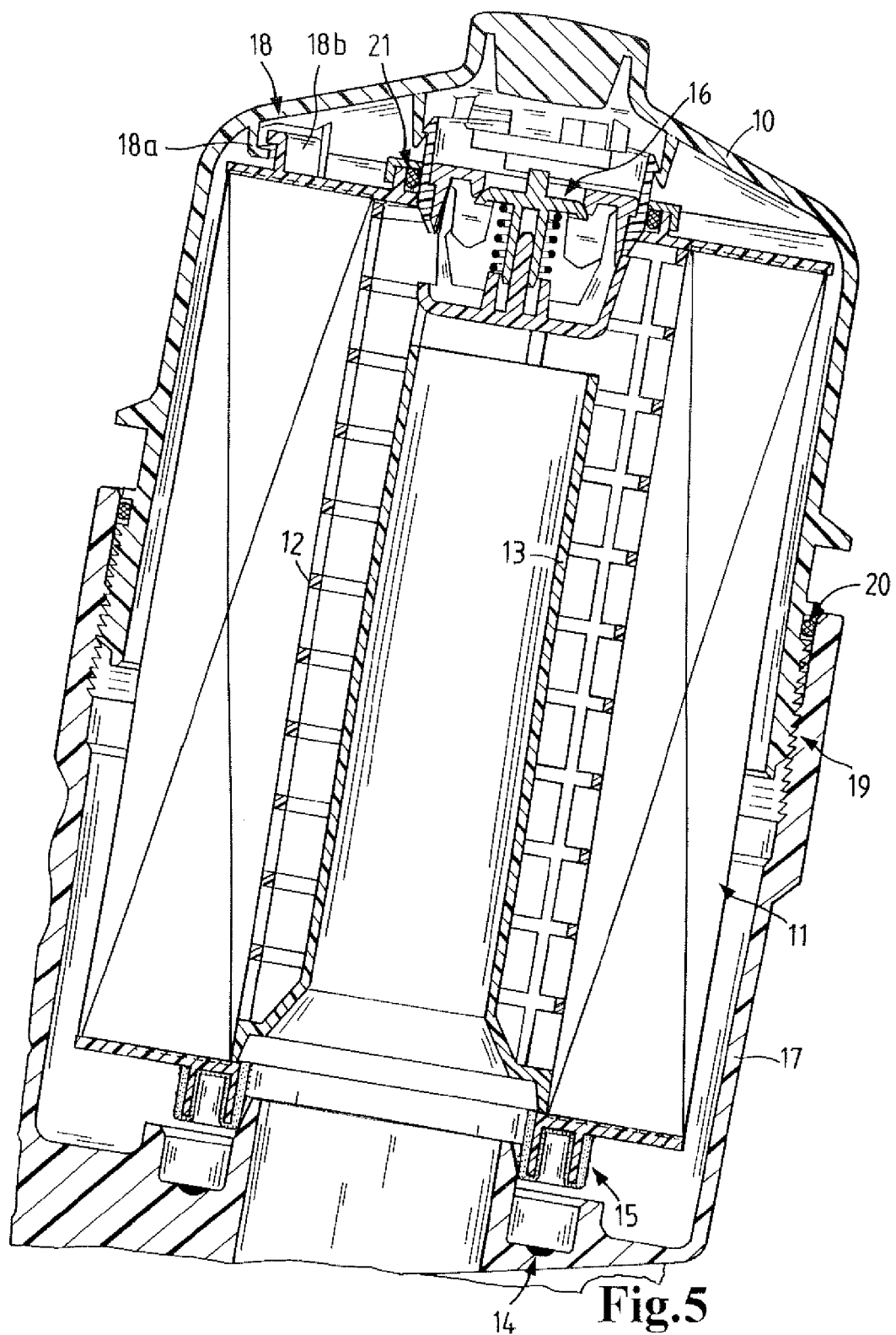
FIG. 5 shows the filter element locked in the filter lid upon removal from the filter housing.

In FIG. 5 the demounted situation is illustrated. When unscrewing the filter lid 10, approximately four turns create a stroke of approximately 12 mm. Friction caused at the lower sealing locations of the seal 15 when unscrewing the filter lid 10 causes the bayonet locks 18b on the filter element 11 to engage the matching bayonet hooks 18a on the filter lid 10 so that the bayonet locks 18b and the filter element 11 are entrained. Because of the thread pitch the filter element 11 moves upwardly and releases the sealing action relative to the unfiltered side. The filtered side remains still sealed by the inner sealing element of the double-concentric seal 15. The unfiltered side can thus drain. Upon further unscrewing also the inner sealing element of the double-concentric seal 15 will release the drain passage 14 and the filtered side can drain. Mixing of unfiltered oil and purified (filtered) oil is prevented. By means of the inner standpipe 13 it is possible to prevent that the oil will drip out of the interior of the filter.

Figure 6:
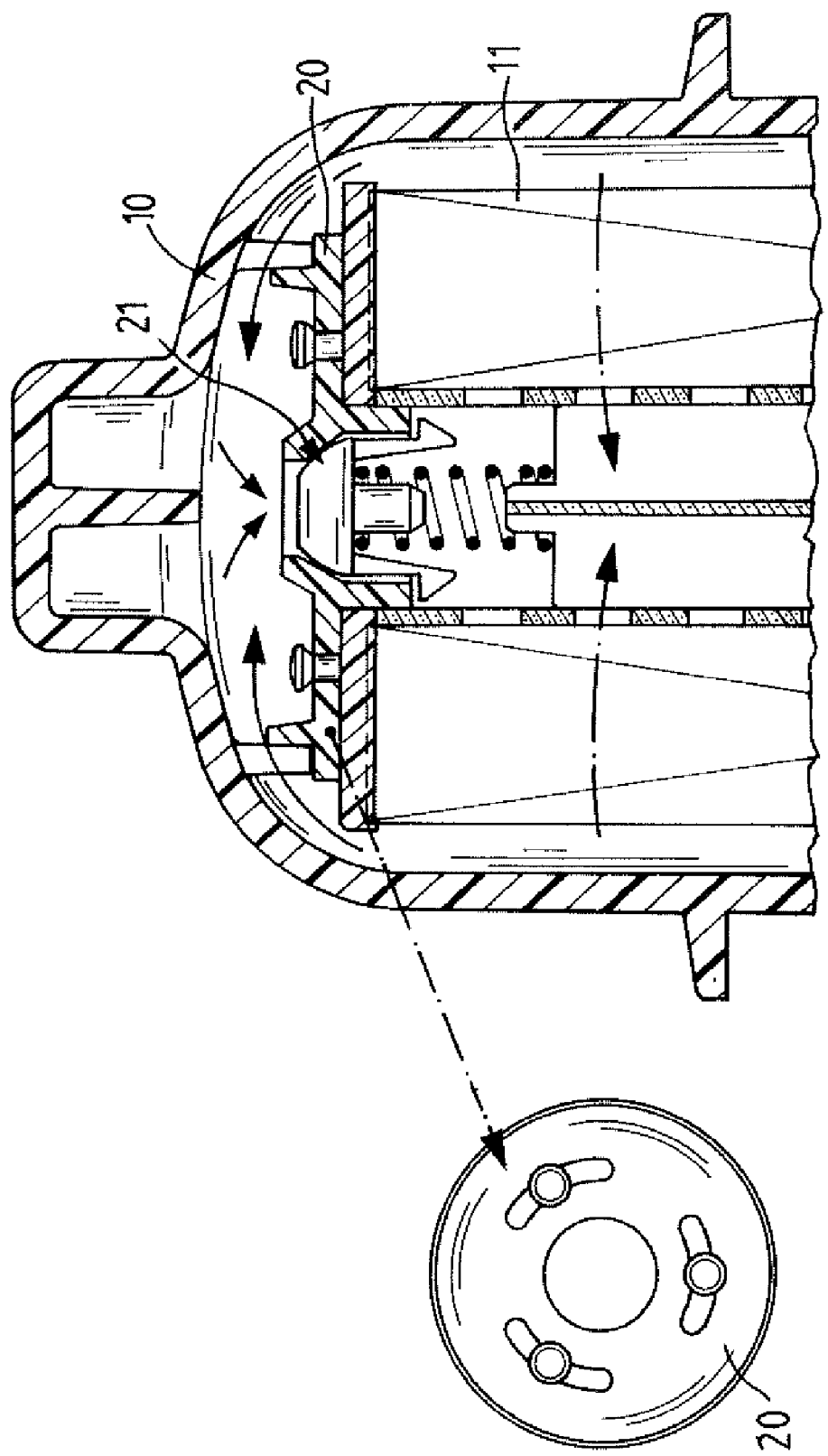
FIG. 6 shows an alternative embodiment of a filter bypass valve.

FIG. 6 shows a filter bypass valve that can be integrated into the filter of FIGS. 1 to 5 but can also be used in other embodiments of an oil filter or fuel filter. When the filter element 11 is attached by means of bayonet closure to a bayonet plate 20 that is fixedly mounted in the filter lid 10 (in one preferred embodiment this attachment is embodied with play and in another embodiment it is without play), the complete valve function is provided. The valve cone 21 that is attached to the filter element 11 seals at the bayonet plate 20 in the filter lid 10.

While the best modes for carrying out the invention have been described in detail, those familiar with the art to which this invention relates will recognize various alternative designs and embodiments for practicing the invention within the scope of the appended claims.

The invention claimed is:

1. A method of rotatably coupling a filter element to a threadably removable lid of a filter housing comprising:
   providing a first set of bayonet connectors on an end of said filter element;
   providing a second set of bayonet connectors on an interior of said lid;
   aligning said first and second set of bayonet connectors such that they couple;
   removably lockably engaging said first and second set of bayonet connectors by rotating said lid relative to said filter element in a first direction such that said filter element is connected to said lid;
   installing said filter having said lid into said filter housing;
   screwing said lid onto said filter housing, wherein said lid is rotated in a second direction relative to said housing, said second direction opposing said first direction; and
   decoupling said filter element from said housing by said screwing step.

2. The method of claim 1, wherein after the screwing step the method further comprises
   closing a drain passage in said filter housing by a double-concentric seal is provided on said filter element.

3. The method of claim 2, wherein after the closing step the method further comprises:
   frictionally engaging said double-concentric seal to seal said filter housing, wherein friction between said double-concentric seal and said housing is greater than friction between said bayonet connectors; and
   rotating said second set of bayonet connectors relative to said first set of bayonet connectors.

* * * * *